3,346,591
PREPARATION OF PARTLY SATURATED
4-KETOBENZOTHIOPHENES
Harold M. Foster, Middlesex, Roger P. Napier, Edison, and Chin-Chiun Chu, North Plainfield, N.J., assignors to Mobil Oil Corporation, a corporation of New York
No Drawing. Filed Dec. 20, 1965, Ser. No. 515,230
4 Claims. (Cl. 260—332.3)

ABSTRACT OF THE DISCLOSURE 4-keto-4,5,6,7-tetrahydrobenzothiophene and 4-keto-2,4,5,6,7,7a-hexahydrobenzothiophene, and alkyl- and alkenyl-substituted derivatives, are produced in a one-step process. 3-mercaptocyclohexanone or an alkyl- or alkenyl-substituted derivative is reacted with chloroacetaldehyde or 2,2-dichloroacetaldehyde in the presence of a protic acid catalyst. They can be dehydrogenated to 4-hydroxybenzothiophenes and then converted to benzothienylcarbamate, useful as insecticides, miticides, and nematocides.

This invention is concerned with a process for preparing partly saturated 4-oxobenzothiophene and ring-substituted derivatives thereof.

The compounds produced by the process of this invention are useful intermediates for the preparation of 4-hydroxybenzothiophenes. The 4-hydroxybenzothiophenes are converted into benzothienyl carbamates by reaction with phosgene to form the chloroformate, followed by reaction with a primary or secondary amine or by reaction with an isocyanate. They are an effective class of pesticides, which control a variety of pests, including Root Knot Nematode, Two-Spotted Spider Mite, Mexican Bean Beetle, Southern Armyworm, Pea Aphid, and House Fly, as fully disclosed in copending application Serial No. 487,333, filed September 14, 1965, now U.S. Patent No. 3,288,673, a continuation-in-part of application Serial No. 427,089, filed January 21, 1965, now U.S. Patent No. 3,288,808, a continuation-in-part of application Serial No. 334,581, filed December 30, 1963, now abandoned, a continuation-in-part of application Serial No. 220,073, filed August 28, 1962, now abandoned. The compounds produced in the process of this invention are converted into 4-hydroxybenzothiophenes by liquid or vapor phase dehydrogenation. Typical procedures for effecting such dehydrogenation are described in copending applications Serial No. 455,604, filed May 13, 1965; Serial No. 458,771, now U.S. Patent No. 3,317,552, filed May 25, 1965 and Serial No. 468,094, filed June 29, 1965.

Accordingly, it is a broad object of this invention to provide a process for preparing intermediates for the preparation of an effective class of pesticides. Another object is to provide a process for preparing intermediates for the preparation of benzothienyl carbamates. A specific object is to provide a process for preparing partly saturated 4-oxobenzothiophene and ring-substituted derivatives thereof. Other objects and advantages of this invention will become apparent to those skilled in the art, from the following detailed description.

This invention provides a process for producing partly hydrogenated 4-oxobenzothiophenes that comprises reacting a cyclohexanone compound having the formula:

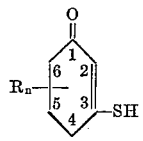

wherein $n$ is 0 to 3, R is selected from the group consisting of alkyl ($C_1$–$C_8$), alkenyl ($C_2$–$C_8$), alkoxy ($C_1$–$C_4$), alkylthio ($C_1$–$C_4$), di($C_1$–$C_4$)alkylamino, and cyano, with a compound selected from the group consisting of chloroacetaldehyde and 2,2-dichloroacetaldehyde in the presence of an acid catalyst.

One reactant used in the process of this invention is 3-mercaptocyclohexanone which can contain ring substituents as indicated in the structural formula set forth hereinbefore. Non-limiting examples of this reactant are 3-mercaptocyclohexanone; 2 - methyl - 3 - mercaptocyclohexanone; 3-mercapto-4-octylcyclohexanone; 3-mercapto-5-butenylcyclohexanone; 3 - mercapto - 6 - propoxycyclohexanone; 3-mercapto-4-diethylaminocyclohexanone; 3-mercapto-5-hexenylcyclohexanone; 3-mercapto - 4 - vinylcyclohexanone; 3-mercapto-5-cyanocyclohexanone; and 3-mercapto-4-ethylmercaptocyclohexanone.

Chloroacetaldehyde and 2,2-dichloroacetaldehyde, of course, are readily available materials. The aldehyde used, however, determines the amount of hydrogenation in the final 4-oxobenzothiophene product. If chloroacetaldehyde is used, the 2,4,5,6,7,7a-hexahydro derivative is obtained. When 2,2-dichloroacetaldehyde is used, the 4,5,6,7-tetrahydro derivative is produced.

The reaction (concurrent condensation and ring closure) involved in the process of this invention can be carried out at atmospheric pressures at temperatures of between about 70° C. and about 100° C. It is preferred, however, to operate at the more elevated temperatures and a temperature of about 90–100° C. has been found feasible. If a pressure vessel is used, temperatures up to about 120° C. can be employed, in order to speed up the reaction. Temperatures higher than 120° C. should be avoided, however, because the reaction products show some thermal instability.

The catalyst for this reaction is a protic acid, i.e., an organic acid, such as p-toluenesulfonic acid, or a mineral acid. Hydrochloric acid appears to be a preferred catalyst, but other mineral acids, such as phosphoric and sulfuric acids can be used, as well as acidic clays, sulfonated resins, etc.

The reaction proceeds rapidly, smoothly, and in good yield when an inert solvent, such as benzene, toluene or xylene, is used to moderate the reaction and to remove by azeotropic distillation water formed in the reaction. The amount of solvent used will generally be between about 2 volumes and about 10 volumes per volume of starting material. Other aromatic, acyclic, and alicyclic hydrocarbons can be employed, but one should be chosen that will form an azeotrope with water at the temperatures set forth hereinbefore, preferably at 90–100° C.

The following examples demonstrate the process of this invention. It must be strictly understood, however, that this invention is not to be limited to the specific reactants and conditions employed, or to the operations and manipulations involved. Other reactants and conditions can be used, as is described hereinbefore.

Example 1

A solution of 9.6 g. 3-mercaptocyclohexanone, and 0.5 g. p-toluenesulfonic acid monohydrate in 100 ml. of benzene was heated to 50° C. Dry chloroacetaldehyde (9.0 g.) was added dropwise, with stirring. The reaction mixture was heated to reflux and water was removed by azeotropic distillation using a water take-off (Dean-Stark) trap. After 3 hours, 2 ml. of water had been collected. By vapor phase chromatography, the product was identified as 4-oxo-2,4,5,6,7,7a-hexahydrobenzothiophene by comparison with an authentic sample. The yield was 30 percent.

Example 2

To a solution of 12 g. 3-mercaptocyclohexanone and 20 g. chloroacetaldehyde hydrate in 100 ml. benzene was added 5 drops of concentrated hydrochloric acid. The reaction mixture was refluxed for 5 hours with water removal by azeotropic distillation. The product was identi-

Example 3

A solution containing 2 g. 3-mercaptocyclohexanone, 6 g. 2,2-dichloroacetaldehyde, 10 ml. benzene and 0.5 ml. concentrated hydrochloric acid was refluxed for 3 hours. Water was removed by azeotropic distillation. There was obtained a 40 percent yield of 4-oxo-4,5,6,7-tetrahydrobenzothiophene. The product was identified by vapor phase chromatography, by comparison with an authentic sample from another source.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process that comprises reacting a cyclohexanone compound having the formula:

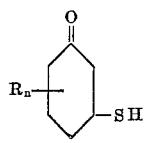

wherein $n$ is 0 to 3 and R is selected from the group consisting of alkyl ($C_1$–$C_8$) and alkenyl ($C_2$–$C_8$), with a chlorine compound selected from the group consisting of chloroacetaldehyde and 2,2-dichloroacetaldehyde, in the presence of a protic acid catalyst; said R occupying any 4–6 position on the ring.

2. The process defined in claim 1, wherein $n$ is 0, said chlorine compound is chloroacetaldehyde, and said catalyst is p-toluenesulfonic acid.

3. The process defined in claim 1, wherein $n$ is 0, said chlorine compound is chloroacetaldehyde, and said catalyst is hydrochloric acid.

4. The process defined in claim 1, wherein $n$ is 0, said chlorine compound is 2,2-dichloroacetaldehyde, and said catalyst is hydrochloric acid.

References Cited

UNITED STATES PATENTS 3,070,606   12/1962   Anderson _____ 260—330.5
3,084,168   3/1963    Hearne _____ 260—340

OTHER REFERENCES

Fieser et al.: Adv. Org. Chem. (1961), pp. 441–3.
Morrison et al.: Organic Chemistry (1959), pp. 636–40.
Tilichenko et al.: Chemical Abstracts (1962) 57, 11042e.

WALTER A. MODANCE, *Primary Examiner.*

C. M. SHURKO, *Assistant Examiner.*